Nov. 13, 1962     H. P. KOPPEHELE     3,063,090
APPARATUS FOR STRETCHING BEADED EDGE FILM
Filed Jan. 22, 1960                                            2 Sheets-Sheet 1
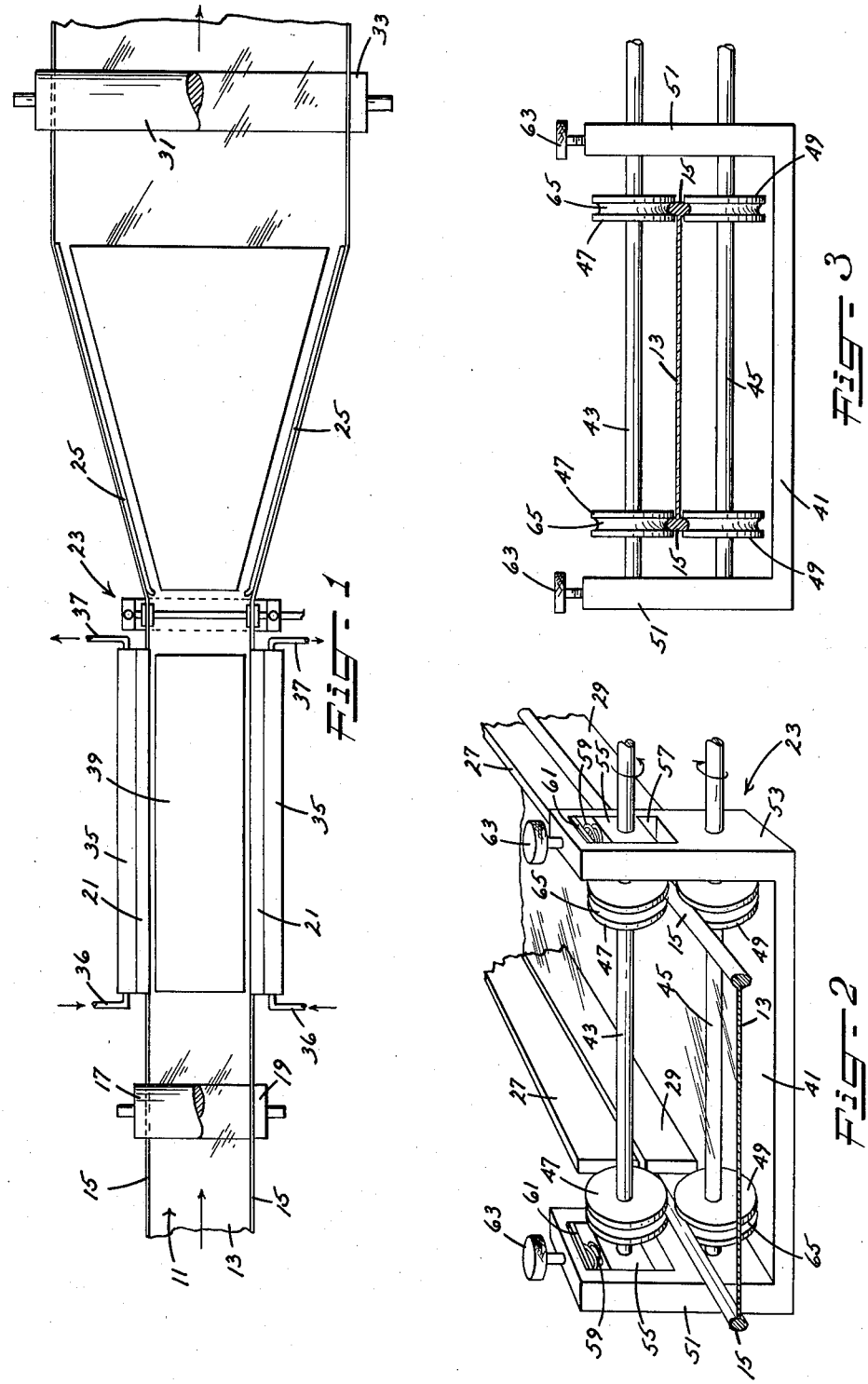

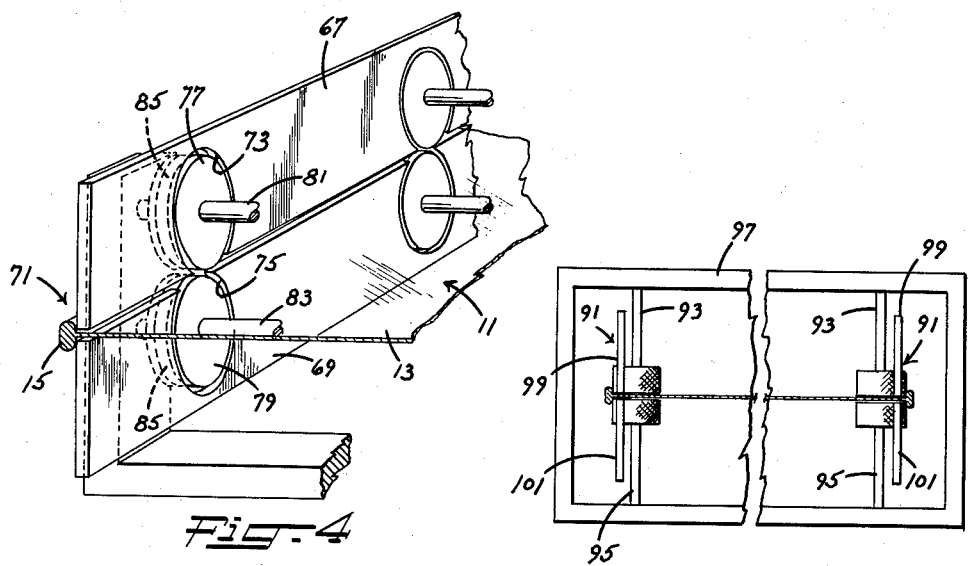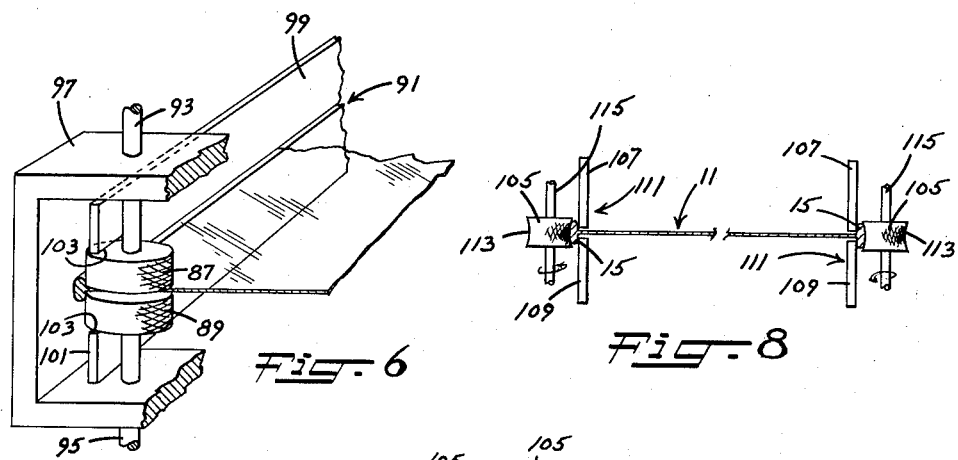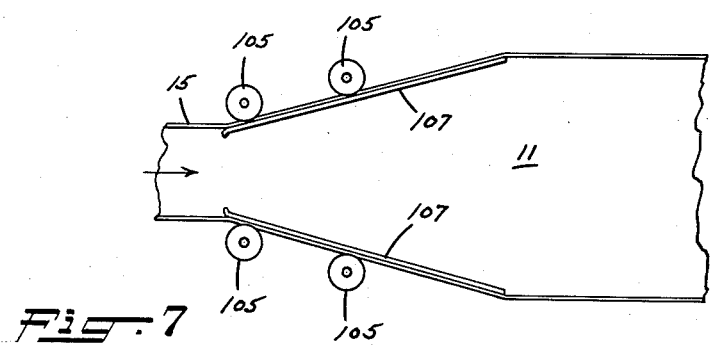

United States Patent Office 3,063,090
Patented Nov. 13, 1962

3,063,090
APPARATUS FOR STRETCHING BEADED EDGE FILM
Hugo Paul Koppehele, Glen Riddle, Pa., assignor to American Viscose Corporation, Philadelphia, Pa., a corporation of Delaware
Filed Jan. 22, 1960, Ser. No. 4,081
4 Claims. (Cl. 18—1)

The present invention relates to the manufacture of plastic films or sheets and particularly to an apparatus for stretching of crystalline polymeric materials to improve the properties thereof.

In the conventional manufacture of films from polymeric materials, as for example from polyethylene and polypropylene polymers, the molten polymer is extruded as a continuous sheet and is then rapidly quenched, as for example by a cooling liquid or gas. To convert this film to a more useful article, the film must be oriented by stretching preferably in two mutually perpendicular or biaxial directions to form a substantially balanced film in which the physical properties, such as tensile strength, elongation, etc., are substantially the same as measured in both directions.

To facilitate longitudinal and transverse stretching of a continuous film, a conventional practice is to initially form the film with thickened or beaded longitudinal edges which are adapted to slidably engage with stationary metal tracks. The tracks serve to restrain the film beads against transverse movement as the film is conveyed and simultaneously drawn in a longitudinal direction, and are disposed in diverging relationship when a simultaneous biaxial stretching of the film is desired. Generally, the film is heated during the actual stretching operation, and in some known procedures may also be preheated just prior to the stretching stage.

In stretching of polymeric films in accordance with the above-noted and other similar conventional procedures, the film beads serve to convey the film relative to the stationary tracks while being simultaneously stretched in a longitudinal direction and must therefore overcome the frictional drag which arises as the film web and beads slide along the stretching tracks (and preheater if employed). With the tracks disposed along divergent paths during biaxial film-stretching operations, the film beads are also subjected to frictional effects induced by the forces acting normal to the tracks as the film web is transversely stretched. It has been discovered, however, that the frictional forces imposed on corresponding portions of the opposite film beads often vary, thus resulting in improper feeding of the film. Such variations in the frictional forces may arise from a number of conditions which are encountered in conventional film extrusion and stretching procedures, as for example a non-uniformity or foreign particle in the film web or beads. When such differences in the frictional forces do occur, the corresponding portions of the opposite film beads are actually advanced at different speeds and thus tend to cock the film web between the stretching tracks.

If the imbalance in the frictional forces acting on the film beads is sufficiently severe, the film either ruptures or jams within the tracks and thereby disrupts the continuous film-stretching operation. More often, however, such imbalance of frictional forces causes fluctuations in the speed at which the film is delivered to and along the stretching tracks. During the stretching operation, for example, the film will be exposed to varying longitudinal forces and will thus exhibit non-uniform properties. More important, when the film is heated prior to stretching these fluctuations in the rate of film delivery affect the transit time of the film through the preheating stage so that the film is not preheated uniformly along its entire length. As such preheated film is subsequently stretched, the hottest areas of the film web will stretch more readily than the adjacent cooler areas, and will exert less transverse tensions on the film beads. This decrease in the transverse tension will in turn permit the film to move at a faster rate during this phase of the stretching operation so that trailing portions of the film will be more rapidly advanced through the preheating stage and will enter the stretching tracks while in a relatively cool condition. The effects induced during stretching of these cooler areas will be the reverse of those which are obtained when the hotter web areas are stretched, and thus the gauge and physical properties of the resulting film will vary along the film length. Further, it has been found that these cyclic fluctuations in the film speed and transverse tensions tend to amplify the original variation in the rate of film delivery and are therefore especially troublesome in continuous mass production operations. Accordingly, a primary object of the present invention is to provide a generally new or improved and more satisfactory apparatus for biaxially orienting thermoplastic polymeric films.

Another object is the provision of an improved stretching apparatus for producing an oriented beaded-edge film having substantially uniform properties along its entire length.

A further object of the invention is the provision of an apparatus for biaxially stretching of beaded-edge films which includes metering means for advancing corresponding portions of the film beads at a uniform and equal rate of speed.

Still another object of the invention is to provide an improved film-stretching apparatus for advancing successive portions of a preheated film at progressively increasing speeds, with corresponding portions of the film beads moving at a uniform and equal rate of speed.

These and other objects and advantages of the invention will become apparent from the following description and accompanying drawing in which:

FIGURE 1 is a plan view of the apparatus of the present invention;
FIGURE 2 is a perspective view of a portion of the apparatus shown in FIGURE 1;
FIGURE 3 is an end view of the apparatus shown in FIGURE 2;
FIGURE 4 is a perspective view of a portion of another embodiment of the present invention;
FIGURE 5 is an end view of a portion of a further embodiment of the present invention;
FIGURE 6 is a perspective view of a portion of the apparatus shown in FIGURE 5;
FIGURE 7 is a plan view of a portion of a still further embodiment of the present invention; and
FIGURE 8 is an end view of the structure shown in FIGURE 7.

In general, the objects of the present invention are achieved by metering the movement of a thermoplastic, polymeric, beaded-edge film so that corresponding portions of the opposite film beads are advanced into a stretching zone at a uniform and equal rate of speed. Preferably, the film is preheated prior to stretching to bring the film web to a higher temperature than the film beads and, as an alternative procedure, the heated film may be stretched in a longitudinal direction by advancing corresponding portions of the film beads at equal but progressively increasing speeds.

The metering device of the present invention is particularly adapted for use with beaded edge films and may be employed with a conventional film stretching apparatus having film bead-engaging tracks disposed in parallel or divergent relationship. While the character of the film has little bearing on the operation of the metering device, from the standpoint of providing a film with balanced properties, it is preferred that the film be preheated in a manner as described in my copending application Method and Apparatus for Stretching Beaded-Edge Films, Serial No. 861,797, filed December 24, 1959.

In one embodiment of the invention, the metering device includes pairs of cooperating rollers disposed between a film preheater and stretching apparatus in position to engage with only the film beads. The rollers are each provided with a circumferential groove to avoid damage to the film beads, and are driven at the same uniform speed to advance corresponding portions of the film beads at an equal rate of speed through the film preheater and into the stretching apparatus. The film stretching apparatus preferably includes a pair of laterally spaced tracks which are adapted to engage with and slidably guide the film beads along parallel or divergent paths. If desired, the metering rollers may be disposed in the plane of the respective tracks and actually form a part of the entrance of the film-stretching apparatus. In other embodiments of the invention, the metering rollers are disposed at longitudinally-spaced intervals along each of the tracks of the stretching apparatus. In these latter embodiments the rollers may be all driven at the same speed or, alternatively, successive pairs of rollers may be driven at progressively increasing speeds to gradually stretch the film in a longitudinal direction.

The metering device of the present invention is hereafter described as employed in the process and apparatus disclosed in my above-referred to application Serial No. 861,797, wherein the web is heated to a higher temperature than the film beads prior to stretching to thus confine transverse film stretching to the film web. The description will thus set forth a preferred environment and application of the present invention. It will be understood, however, that the present invention is also equally well adapted for use with other similar film-stretching apparatus with or without preheating means.

With reference to FIGURES 1–3 of the drawing for a more detailed description of the invention the film to be stretched, indicated at 11, is of conventional configuration having a web 13 of substantially uniform thickness and enlarged or beaded longitudinal edges 15. A pair of rolls 17 and 19 serve to guide the film 11 to a pair of laterally spaced, substantially parallel guides or tracks 21 which are adapted to slidably engage with the film beaded edges 15. The film 11 is advanced relative to the guides 21 by a metering device 23 and is delivered between a pair of tracks 25 with the film beads 15 moving at a uniform and equal rate of speed. The tracks 25 each consist of a pair of spaced plates 27 and 29 between which the film web 13 is adapted to ride as the film is advanced by a pair of take-up rolls 31 and 33. In this embodiment of the invention the rolls 31 and 33 are driven at a faster speed than the metering device 23 to induce a longitudinal stretching of the film.

The guides 21 are secured to elongated closed ducts 35 through which a heated medium may be circulated as by pipes 36 and 37. Both the guides 21 and the ducts 35 are formed of metal or other suitable material which will readily conduct heat to the film beaded edges 15 from the heated medium circulating through the duct 35. Radiant panels 39, or other suitable means such as steam panels, etc., are adjustably mounted along one or both sides of the path traversed by the film as it is advanced relative to the guides 21 for heating the film web 13 independently of the means employed in heating the film beads. To shield the beaded edges of the film from the heat radiated by the panels 39, and thus afford better control over the temperature of the film beaded edges, the outer surfaces of the ducts 35, and if necessary, the guides 21 are covered with a heat-insulating material.

The metering device 23 is positioned between the film preheating assembly and the stretching tracks 25 and includes a frame 41, a pair of shafts 43 and 45 rotatably mounted on the frame 41, and pairs of film bead-engaging rollers 47 and 49 fixed to the shafts 43 and 45, respectively. The shafts 43 and 45 extend through flanges 51 and 53 of the support frame 41 and are driven in opposite directions at an equal and uniform rate of speed by suitable means, not shown. For ease in lacing and to avoid damage to the metering device in the event the rollers 47 and 49 are jammed, at least one of the shafts 43 and 45 is preferably resiliently mounted for movement away from the other of such shafts. Thus, as illustrated in FIGURE 2, the shaft 43 is carried by journal blocks 55 which are in turn slidably mounted within corresponding openings 57 formed in the support frame flanges 51 and 53. Springs 59 are interposed between the blocks 55 and pressure plates 61 for resiliently urging the rollers 47 against the film beads 15 with a desired force, as determined by the adjustment of screws 63. The rollers 47 and 49 are provided with peripheral grooves 65 which together cooperate to encompass and firmly grip the film beads without damaging the same.

As the heated film leaves the guides 21 its uniformly advancing beaded edges 15 are slidably engaged by the tracks 25 which are preferably disposed in divergent relationship for effecting a gradual stretching of the heated film web in a transverse direction concomitantly with the longitudinal drawing thereof by the rolls 31 and 33. As heretofore mentioned, the tracks 25 are each formed of plates 27 and 29 which together restrain the respective film beads to desired paths while allowing the film web 13 to travel therebetween.

In using the above-described embodiment of the invention, the film 11 is passed between the rolls 17 and 19 after which its beaded edges 15 are slidably engaged with the guides 21 and passed between the cooperating pairs of rollers 47 and 49 of the metering device 23. A heated fluid, either a gas or liquid, is circulated through the ducts 35 and the radiant panels 39 are rendered operative and adjusted into desired positions adjacent to the film path. The rollers 47 and 49 are then rotated to advance the film beads at the same rate of speed so that the film is continuously drawn through the preheating assembly at a uniform rate.

The fluid medium circulated through the ducts 35 is designed to heat the film beaded edges 15 to a temperature below or up to the softening range of the polymeric material from which the film 11 is formed and thus its temperature will depend upon such factors as the particular polymeric material employed, the speed of film travel, the rate of heat transfer to the guides 21, etc. The radiant panels 39, on the other hand, serve to heat the film web 13 to a temperature above that of the beads and preferably within the softening range of the polymeric material but below the temperature at which the polymeric material is molten so that the surface temperature of the panels 39 will also be varied with the particular polymeric material, the rate of film travel, etc. It will of course be understood that during the initial lacing of the film through the apparatus, the temperature of the radiant panels 39 are so adjusted as to avoid overheating of the film.

As the heated film 11 is advanced beyond the metering device 23, its beaded edges are slidably engaged with the tracks 25 and then advanced in-between the take-up rolls 31 and 33. The tracks 25 may be disposed in substantially parallel relationship during the initial lacing of the apparatus, and may be subsequently adjusted into a desired diverging relationship. The take-up rolls 31 and 33 are driven at a speed greater than that of the metering rollers 47 and 49 so as to stretch both the heated web and beads of the film longitudinally to substantially the same degree as the film is advanced along the tracks 25. Concomitantly with this longitudinal advancement and stretching of the film, the film beads 15 are directed along divergent paths by the tracks 25 to thereby induce a transverse stretching of the film web 13. As heretofore mentioned, the film web is heated to a temperature higher than that of the film beads, and preferably to within the softening range of the polymeric material from which the film 11 is formed, and thus will more readily respond to the transverse stretching forces. Thus, in view of the temperature differential maintained between the film web and beads, substantially all of the transverse stretching of the film will be confined to the film web itself. The stretched film is cooled as it passes between the take-up rolls 31 and 33 and is collected by suitable means, not shown.

It will be noted that the positive and equal pulling force exerted on the film beads by the metering rollers 47 and 49 eliminates any tendency for the film to become cocked within the preheating assembly and provides full assurance that all portions of the film undergo the same duration of preheating. Equally important, the metering device 23 serves to localize any variations in the film travel which may be occasioned during the film-stretching operation. Thus, temporary fluctuations in the speed of film travel along the tracks 25 would not be transmitted rearwardly to those portions of the film approaching or within the preheating assembly and at most would cause the film to loop slightly between the metering device and the entrance to the tracks 25 until the cause of such fluctuation is removed. Since any tendency for the film to become slack will occur in the region outside of the tracks 25, there is no danger of film jamming along the tracks themselves.

In general, the stretching phase of the described method is of relatively short duration, usually of less than ten seconds, so that the temperature differential between the film beads and web remains substantially uniform throughout the entire stretching operation. The heat generated during the orientation of the polymer molecules will at least in part compensate for any heat losses and, if desired, the stretching apparatus may be enclosed within a chamber or like structure to avoid undesired film cooling. In cases where an unusually long stretching zone is employed or the film is advanced at a relatively slow rate, it may be also desirable to heat the film during the stretching operation.

While the metering device of FIGURES 1–3 has been described as being a separate unit which is mounted between and independently of the preheating and stretching apparatus, the pairs of rollers 47 and 49 may be disposed substantially in the plane of the respective tracks 25 so as to form the entrance thereof. Alternatively, a series of metering rolls may be disposed at spaced intervals along the entrance portion or the entire length of each of the stretching tracks. Thus, as shown in FIGURE 4 plates 67 and 69, forming a stretching track 71, may be provided with corresponding openings 73 and 75 for receiving rollers 77 and 79. The corresponding rollers 77 and 79 along the opposite stretching tracks 71 are fixed to shafts 81 and 83 which are driven at a uniform and equal rate of speed by suitable means, not shown. The rollers 77 and 79 of each pair of cooperating rollers are formed with peripheral grooves 85 which are aligned with the beads 15 of the preheated film 11 for advancing the same in a manner as heretofore described in relation to rollers 47 and 49.

It will be understood that the metering device of FIGURE 4 is designed to be incorporated into the apparatus shown in FIGURE 1 and may be employed in combination with or in place of the metering device 23. The stretching tracks 71 correspond to the tracks 25 shown in FIGURE 1 and, as heretofore mentioned, may be provided with pairs of cooperating rollers 77 and 79 along their entrance portions to assure uniform movement of the film through the preheating assembly and into the diverging stretching tracks 71. Alternatively, cooperating pairs of rollers 77 and 79 may be disposed at spaced intervals along the length of each of the tracks 71. When such tracks are positioned in diverging relationship, the cooperating rollers 77 and 79 may be all rotated at a uniform and equal rate of speed to effect a transverse stretching of the film web while simultaneously metering the film travel. With such an arrangement, it will be also apparent that each successive pair of rollers may be driven at a slightly faster speed than the immediately preceding pair of rollers and thus achieve a progressive longitudinal stretching of the film as it travels along the diverging track. In this mode of operation, corresponding pairs of rollers along the opposite stretching tracks would be driven at a uniform and equal rate of speed so that metering function of the device is maintained. It will further be apparent that with this last-mentioned arrangement, the tracks 71 may be positioned along parallel planes to thereby achieve stretching of the film 11 in only a longitudinal direction. Regardless of the manner in which this embodiment of the invention is employed, it will be noted that the plates 67 and 69 of the tracks 71 continuously guide or restrain the film beads 15 along desired paths. Thus, during longitudinal or biaxial film stretching operations, uniform transverse stretching of the film web will be achieved and the resulting film will be free of scalloped edge formations.

In the embodiment of the invention illustrated in FIGURES 5 and 6, rollers 87 and 89 are supported in-between and at substantially right angles to the plane of stretching tracks 91 by means of shafts 93 and 95 and supporting frame 97. Plates 99 and 101, forming each of the stretching tracks 91, are provided with openings 103 which permit the rollers 87 and 89 to project into engagement with the film beads 15. The rollers 87 and 89 are positioned so as to space the opposing faces thereof a distance slightly greater than the thickness of the film web and are rotated at a uniform and equal rate of speed by suitable means, not shown. It will be apparent that the apparatus of FIGURES 5 and 6 may be employed solely as a film metering device or as a combined metering and stretching means in much the same manner as the structure of FIGURE 4, described above.

Metering of the film 11 may be also effected as shown in FIGURES 7 and 8 by rollers 105 slidably urging the film beads 15 along the outermost surfaces of plates 107 and 109 forming the stretching tracks 111. The rollers 105 are formed with concave peripheral surfaces 113 to assure a firm engagement with the film beads, and are carried by shafts 115 which in turn are driven at a uniform and equal rate of speed. This modification of the invention will operate in substantially the same manner as the structures of FIGURES 4–6, and may be employed in either uniaxial or biaxial film stretching procedures.

It will of course be apparent that the above-described devices are designed to perform a precise metering function and thus care must be exercised in the manufacture and assembly of the units, as well as in the selection of efficient roller driving means. To assure a positive gripping and advancement of the film beads, the bead-engaging surfaces of the various described rollers may be suitably roughened, as for example by knurling. Further, in the embodiments of the invention in which a series of rollers are employed, the use of synchronized roller drive units are preferred to thus adopt the apparatus for various operating conditions.

While preferred embodiments of the invention have been shown and described, it is to be understood that changes and variations may be made without departing from the spirit and scope of the invention as defined in the appended claims.

I claim:

1. Apparatus for orienting a thermoplastic polymeric film having a web and beaded longitudinal edges including a pair of tracks for slidably engaging with and guiding the beaded edges of the film, a series of rollers positioned along each of said tracks for engaging with the beaded edges of the film, the rollers of each of said series of rollers being disposed at longitudinally spaced intervals within the length of the respective tracks, with the rollers of one series being substantially aligned with corresponding rollers of the other of such series, means for rotating successive rollers of each series of rollers at a greater speed than preceding rollers of such series, with aligned rollers being driven at a uniform and substantially equal rate of speed whereby the film is progressively stretched in a longitudinal direction concomitantly with its advancement along said tracks, and means for heating the film at least prior to stretching thereof.

2. Apparatus as defined in claim 1 wherein said tracks are disposed in diverging relationship whereby the film web is simultaneously stretched in longitudinal and transverse directions concomitantly with its advancement, and wherein the rollers of each series of rollers are mounted for rotary movement about axes which are substantially perpendicular to a plane passing through the film engaging portions of said tracks.

3. Apparatus for orienting a thermoplastic polymeric film having a web and beaded longitudinal edges including a pair of tracks disposed in diverging relationship for slidably engaging with and guiding the beaded edges of the film, walls defining openings in each of said tracks at longitudinally spaced intervals thereof, pairs of cooperating rollers positioned within said openings for together engaging with the beaded edges of the film, with the pairs of cooperating rollers disposed along one of said tracks being substantially aligned with corresponding pairs of rollers along the other of said pair of tracks, means for rotating the cooperating rollers of each successive pairs of rollers at a greater speed than preceding pairs of rollers, with aligned pairs of rollers being driven at a uniform and substantially equal rate of speed whereby the film web is progressively and simultaneously stretched in longitudinal and transverse directions concomitantly with the advancement of the film.

4. Apparatus for orienting a thermoplastic polymeric film having a web and beaded longitudinal edges including means for heating the beaded edges of the film, means for preheating the film web to a higher temperature than the beaded edges of the film, a pair of laterally spaced tracks disposed in diverging relationship for slidably engaging and guiding the beaded edges of the film after preheating thereof, walls defining openings at least within the entrance portions of said tracks, pairs of cooperating rollers disposed within said openings for engaging with the film beaded edges, means for positively rotating said pairs of rollers at a uniform and equal rate of speed, said rollers serving to draw the film through the preheating means at a metered rate to insure uniform heating of all portions of the film web, and means for advancing the film along said tracks and concomitantly tensioning the same in a longitudinal direction, whereby said rollers further serve to nip the beaded edges of the film during the application of said longitudinal tensions.

References Cited in the file of this patent

UNITED STATES PATENTS

| | | |
|---|---|---|
| 2,034,716 | Dreyfus | Mar. 24, 1936 |
| 2,342,891 | Powers | Feb. 29, 1944 |
| 2,618,012 | Milne | Nov. 18, 1952 |
| 2,659,931 | Dettmer | Nov. 24, 1953 |
| 2,728,941 | Alles et al. | Jan. 3, 1956 |
| 2,778,057 | Clark | Jan. 22, 1957 |
| 2,841,820 | Pfeiffer | July 8, 1958 |

FOREIGN PATENTS

| | | |
|---|---|---|
| 780,590 | Great Britain | Aug. 7, 1957 |